A. MILLIKEN.
Shanks for Buttons.
No. 218,186.  Patented Aug. 5, 1879.
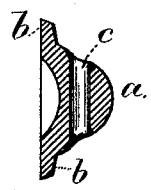
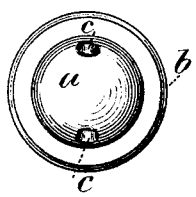
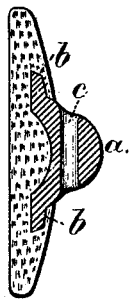
Witnesses
Chas. H. Smith
Geo. T. Pinckney
Inventor
Alonzo Milliken
per Lemuel W. Serrell
Atty

UNITED STATES PATENT OFFICE.

ALONZO MILLIKEN, OF BROOKLYN, NEW YORK.

IMPROVEMENT IN SHANKS FOR BUTTONS.

Specification forming part of Letters Patent No. 218,186, dated August 5, 1879; application filed June 18, 1879.

*To all whom it may concern:*

Be it known that I, ALONZO MILLIKEN, of Brooklyn, in the county of Kings and State of New York, have invented an Improvement in Shanks for Buttons, of which the following is a specification.

Shanks have been made for buttons of a metal plate, to which an eye is attached, and in other instances buttons have been made of composition in imitation of ivory, horn, and other substances, the same having a projection or teat at the back, through which a hole is bored. The button, however, is liable to be broken in boring the hole.

My invention relates to the button-shank made of type-metal, and cast with a flange by which the shank is connected to the button, and a hole through which the threads are passed in sewing on the button.

This type-metal button-shank is a new article of manufacture, the said shank of type-metal being adapted for use with buttons of various kinds.

In the drawings, Figure 1 is a section, and Fig. 2 is an end view, of the type-metal shank in enlarged size, and Fig. 3 represents the same attached to a button.

The shank $a$ has a flange, $b$, around the same, and the body of the shank is in the form of a teat, through which passes the hole $c$, the ends of which are countersunk or rounded, so as not to cut the thread.

This type-metal shank is cast in a mold of corresponding shape, and there are pins to form the hole in the shank, which pins are to be withdrawn after the shank has been cast.

In some instances the flange of the shank may be cast into a recess in the button, a button being placed in the machine previous to each casting.

In cases where the button is formed of composition, the type-metal shank will be placed in the die, and the composition pressed around the same, as shown in Fig. 3, and when the button is made of metal, shells, or of cloth or other flexible material, such shank may be put into the collet and placed in the die that closes the parts and unites them together.

I am aware that buttons have been made of cast metal in one piece, including the shank, and that type-metal has been employed, but the shank was not in the form of a teat, neither was there any hole through the same, nor a flange by which the same could be connected with the button.

My shank is adapted to be sewed on, and is a new article of manufacture.

I claim as my invention—

1. The shank for a button, made of type-metal, cast in the form of a teat, and having a flange and a hole through the teat, substantially as set forth.

2. A shank for buttons made of type-metal, and cast with a flange and hole through the shank, substantially as set forth.

Signed by me this 16th day of June, A. D. 1879.

A. MILLIKEN.

Witnesses:
 GEO. T. PINCKNEY,
 WILLIAM G. MOTT.